UNITED STATES PATENT OFFICE.

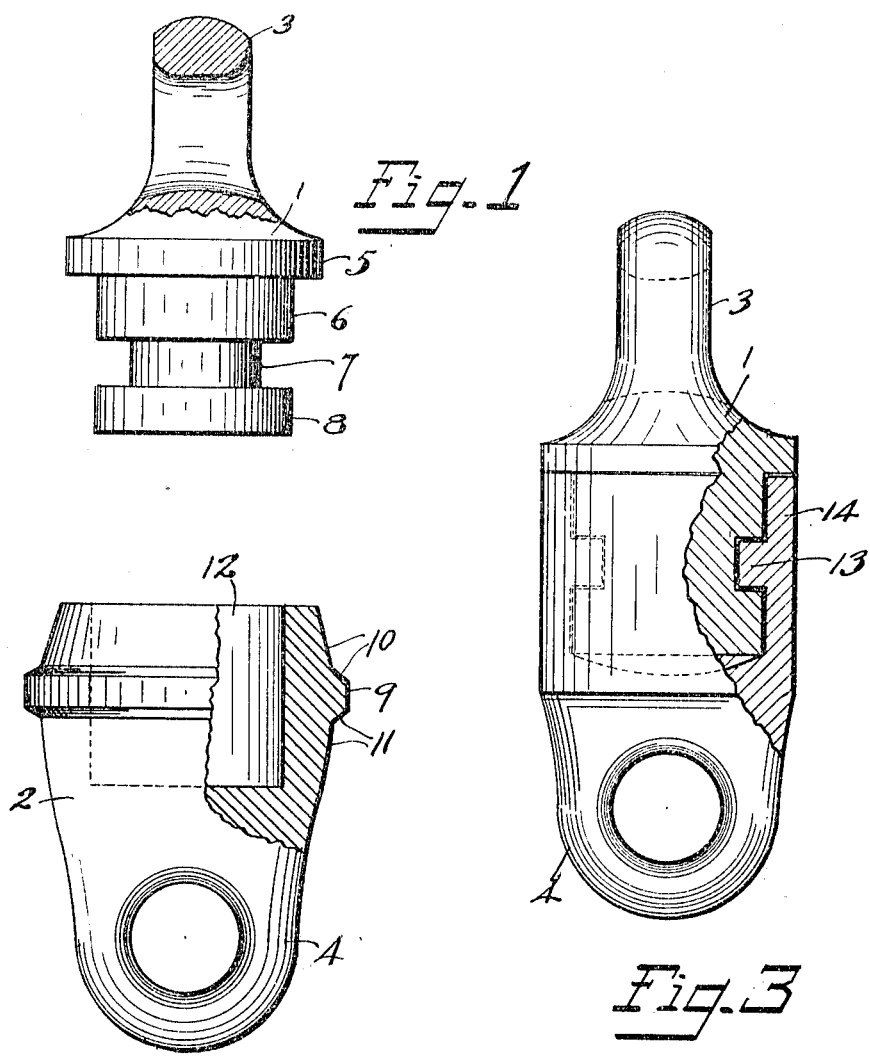

WILLIAM R. CLARKSON, OF SPOKANE, WASHINGTON, ASSIGNOR TO CLARKSON MFG. CO., OF SPOKANE, WASHINGTON.

PROCESS OF MAKING SWIVELS.

1,316,8..

Specification of Letters Patent. Patented Sept. 23, 1919.

Application filed September 23, 1918. Serial No. 255,232.

*To all whom it may concern:*

Be it known that I, WILLIAM R. CLARKSON, a citizen of the United States, residing at E. 1306 Trent avenue, Spokane, county of Spokane, and State of Washington, have invented certain new and useful Improvements in Process of Making Swivels, of which the following is a specification.

The present invention relates to an improved process of making swivels, and is designed to provide a practically one-piece swivel that is durable, simple in its process of production, and efficient in performing its functions.

The invention involves the process of heating one of the members of the swivel device, which has previously been specially constructed, and transforming the shape of this member in the process of forming the swivel, and this end is accomplished by pressing the member into operative relationship with the complementary member, in a die, in usual manner.

In the accompanying drawings the process is illustrated, wherein the members of the swivel are depicted in their condition both before and after completion of the swivel, and the accompanying specification and claims set forth the physical embodiment of the invention according to the best mode so far devised for the practical application of the principles of the invention.

Figure 1 is a view of the spindle or male member of the swivel.

Fig. 2 is a view of the female or barrel member of the swivel before it is transformed to its finished condition.

Fig. 3 is a view, partly broken away showing the completed swivel.

In the process of making the swivel device I employ the two members 1 and 2, the former the usual spindle or male member, and the latter a specially formed barrel or female member, which, according to the process of the present invention is to be permanently attached to the spindle to rotate as usual thereabout.

The two members are provided with the usual eyes 3 and 4, and the spindle is formed with a large annular shoulder or base ring 5 at the base of the cylindrical head 6. The head 6 is formed with an annular groove or recess 7 which forms, at the extreme end of the head, a bearing head or flanged head 8 of less diameter than the shoulder 5, and of course the recessed part of the head is of less diameter than the bearing head.

The original barrel or socket member of the swivel is fashioned with an exterior, annular rib 9 and above and below the rib are formed the fillets 10 and 11, while the interior of the barrel is formed with a chamber 12 which is cylindrical in shape and formed with a smooth bore.

In the process of manufacture of the swivel, the rib 9 and fillets 10 and 11 are eliminated, and an interior rib 13 is formed on the cylindrical barrel 14 as seen in Fig. 3 which shows the completed article.

Preparatory to transforming the barrel 2 and connecting it with the spindle portion, a coating of paste, preferably of graphite is laid upon the exterior surfaces of the spindle, and upon the interior walls of the chamber 12 of the barrel. Then the spindle is placed within the chamber 12 of the barrel, and the barrel, or the metal thereof comprising the rib 9 and its fillets and the adjacent metal, is heated to a sufficient temperature to bring the metal to a malleable or plastic condition. While the barrel is heated, and with the spindle head in the chamber 12, the parts are placed in a die of proper capacity and suitable power, and the die is actuated to compress the rib and its fillets, until the barrel is brought to the formation shown in Fig. 3, the rib 9 and its fillets 10 and 11 having been dissipated, and the interior flange or rib 13 having been formed in the interior socket of the cylindrical barrel member 14.

The finished swivel device now presents a smooth article that is compactly arranged and freely rotatable, the recessed or grooved head 6 and the interior rib 13 of the barrel freely co-acting in usual manner, and the graphite coating between these parts not only serves to prevent the two members sticking or "freezing" during the compression, but also performs the function of a lubricant for the completed swivel.

The fillets 10 and 11 and the rib 9 are of course squeezed into the interior of the barrel and the outer circumference of the barrel is made cylindrical, while the edge of the barrel is spread and pressed to shape toward the flange 5 of the spindle, thus preventing a gap between the spindle and barrel at this joint and providing a smooth, practically continuous cylindrical surface 1 between the two eyes of the swivel. Very excellent results have been obtained by using graphite as the coating or paste between the members, but it will readily be understood that other material that is suitable may be utilized when desired or required.

From the above description taken in connection with the drawings it is evident that I have provided a novel process of making swivels, and in actual practice the process hereinbefore indicated has been very satisfactory and gratifying in its results.

Claims:

1. The process of making a swivel which consists in applying a single open end barrel member having a smooth bore and an exterior rib to a spindle having a recessed head, heating the material of the rib, and compressing the ribbed barrel to form a barrel having an interior rib engaged in the recessed head.

2. The process of making a swivel which consists in applying a barrel member having an exterior rib and adjoining fillets to a spindle having a recessed head and annular flanged head, heating the barrel and pressing the heated portion of the barrel to transform the exterior rib and fillets into an interior rib engaging the recessed head and shape the barrel into a cylindrical barrel with its open edge in close contact with said flanged head.

In testimony whereof I affix my signature.

WILLIAM B. CLARKSON.